Dec. 5, 1967  J. A. TABOR  3,356,121
PREVAILING-TORQUE LOCKNUTS
Filed May 5, 1966  3 Sheets-Sheet 3

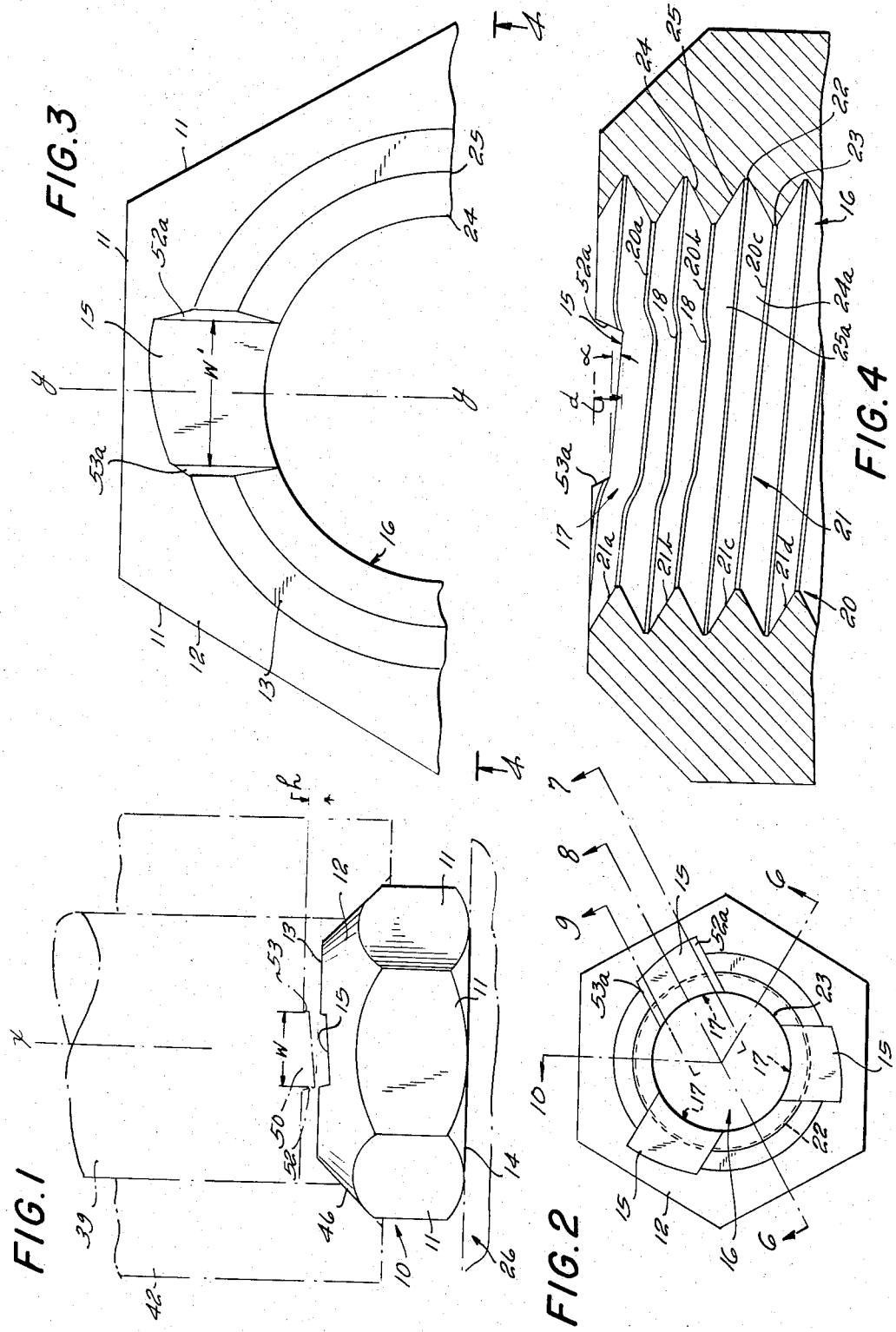

United States Patent Office 3,356,121
Patented Dec. 5, 1967

3,356,121
PREVAILING-TORQUE LOCKNUTS
Joseph A. Tabor, Port Chester, N.Y., assignor to Russell, Burdsall & Ward Bolt and Nut Company, Port Chester, N.Y., a corporation of New York
Filed May 5, 1966, Ser. No. 547,894
4 Claims. (Cl. 151—21)

ABSTRACT OF THE DISCLOSURE

A prevailing-torque locknut of the all metal thread deflection type having a hexagon body portion and a truncated cone portion at its upper or trailing end, the upper surface of the cone portion having a plurality of equal depth, circumferentially equally spaced, depressions of the same size and dimension extending from the threaded bore of the nut through the conical surface of the truncated cone, the bottom of each depression lying at the same depth and at the same helix angle as the thread of the nut and a plurality of arcuate offset locking thread segments in the upper turns of the thread below said depressions.

This invention relates generally to threaded fasteners, and more particularly to locknuts, and still more particularly to locknuts of the prevailing-torque type.

Locknuts are divided into two general classifications, namely, prevailing-torque and free-spinning types. Prevailing-torque locknuts spin freely for a few turns, then must be wrenched to final position. Locking power is reached when the part, or parts, of the nut thread that imparts the locking feature and the threads of the bolt are engaged. Locking action is maintained until the nut is turned in removal direction sufficiently to disengage the locking parts of the nut from the thread of the bolt. Prevailing-torque locknuts are in turn classified in several classes; one of which is "thread deflection" type wherein thread deflection causes friction to develop when the threads of the nut and bolt are mated; thus the nut resists loosening. For further descriptions and specifications for locknuts, reference is made to a publication sponsored by the Industrial Fasteners Institute, entitled Fasteners—Summer 1963, volume 18, Number 2.

There is to be found in the prior patented art a large variety of prevailing-torque locknuts in which the threads are distorted. In some, the threads are distorted by exerting a force or forces in a radial direction toward the central axis of the bore of the nut so that the distortion of the threads is such that the bore at the crests of the threads is out-of-round. In others, the forces applied are both radial and axial with at least a part of the resultant force exerted in a radial direction, also resulting in an out-of-round threaded bore that is not truly cylindrical.

This invention is distinguished from that type, in that the threads are deflected or distorted, as more fully disclosed hereinafter, by exerting forces on the threaded nut blank only in an axial direction and the crest of the thread is not deformed to out-of-round, and if there be any unwanted radial distortion, it is negligible and of no significance. And although there are prior art disclosures of nuts that have their threads distorted by exerting forces axially, the tools, which were used to produce the indentations in, or deflection of, the helix thread, were not such as to form thread deformations or indentations of substantial arcuate length which indentations were parallel with, or of the same helical angle as the helix angle of the thread of the threaded blank before distortion. That is to say, the distorted arcuate indentations were such that they did not engage the mating male thread with uniform pressure or spring action along the entire arcuate length of the indentations, but rather the indented portions of the thread engaged the male mating thread at a single point or locus, notwithstanding that the indentations were of substantial arcuate length.

Summary of invention

In accordance with this invention, as will more fully appear from the more detailed description which follows, a locknut of the prevailing-torque type, having a hexagonal body portion and a truncated cone portion at its upper end, is provided by depressing the threads of the threaded or tapped nut blank in separated circumferential areas of the truncated cone portion around the bore with a tool which exerts its force on the upper face of the threaded blank in only an axial direction and the tool is so contrived that three, or more if desired, equally circumferentially spaced depressed areas or indentations are formed in the top face of the nut around the hole; the width of the indentations being less than the diameter of the bore, and the bottom faces of the staking tool which contact the surface face of the nut are not parallel with the face of the nut but are inclined, so that the contacting faces of the staking tool lie in a plane which is not parallel with the plane of the top surface of the nut, but the contacting faces of the tool are parallel with the helix angle of the thread of the nut (that is, the bottom face of the tool for each depressed area or indentation around the bore of the nut has the same angle from horizontal as the helix angle of the thread from horizontal). As a result, a prevailing-torque locknut is produced in which the first few turns of threads at the top portion of the threaded bore are offset in the circumferentially spaced depressed areas to provide spaced sets, or clusters, of superimposed thread indentations of substantial arcuate length around the hole of the nut; each of the indentations in each turn of the thread being offset from the remainder of that turn of the thread which retains its initial position and helix angle and the indentations in each cluster have the same helix angle as the undistorted portion of the thread. Such a locknut, made according to the invention, has advantages over prior prevailing-torque, all metal, locknuts in that when turned to locking position on a threaded bolt having a male thread, the offset locking thread portions apply pressure and spring action on the flanks of the male thread uniformly along the whole arcuate length of the indented portions. Consequently, by lengthening or shortening the arcuate length of the offset portions of the thread, nuts having predetermined greater or less locking power may be produced. Furthermore, prevailing-torque locknuts may be made, according to the invention, which exceed the standards required to meet the specification set up by the Industrial Fastener's Institute for prevailing-torque locknuts.

Although the novel features which are believed to be characteristic of the invention are pointed out in the annexed claims, the invention itself as to its objects and advantages and the manner in which it may be carried out may be better understood by reference to the following more detailed description, considered in connection with the accompanying drawings forming a part hereof, in which:

FIG. 1 is a view in elevation of a nut, embodying the invention; the tool for forming the nut from a threaded nut blank being shown diagrammatically in broken lines;

FIG. 2 is a top plan view of the nut, shown in FIG. 1;

FIG. 3 is a partial top plan view of the nut to larger scale;

FIG. 4 is a partial view in section on line 4—4 of FIG. 3;

Figure 11:
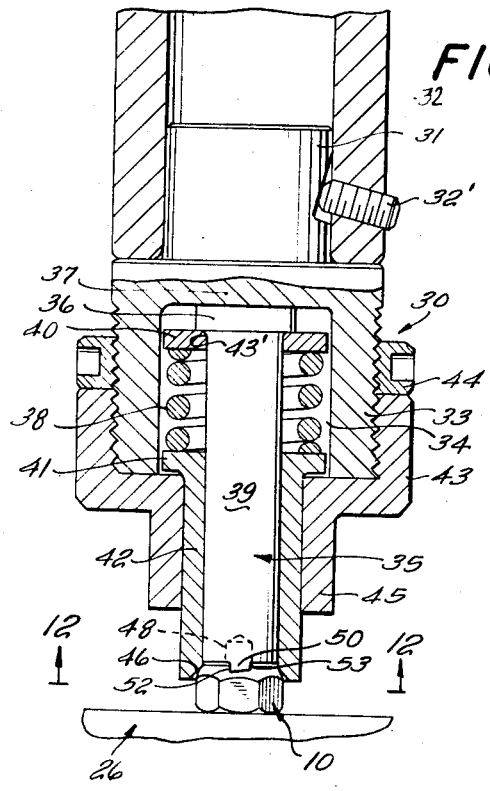
Figure 12:
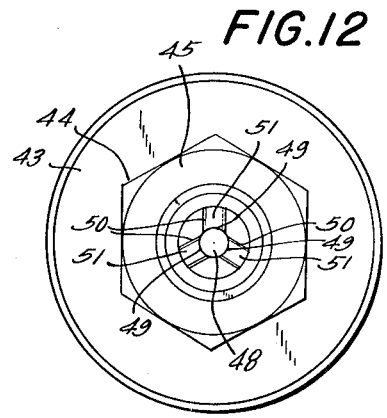
Figure 13:
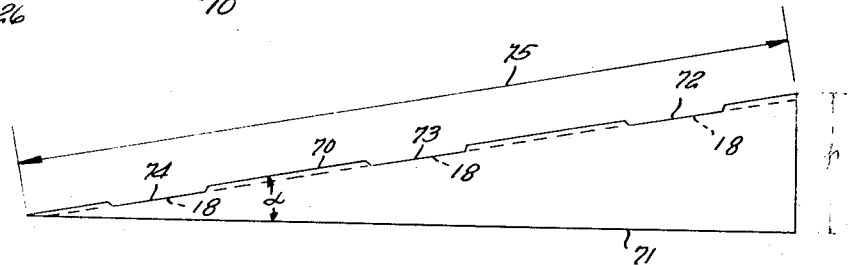
Figure 14:
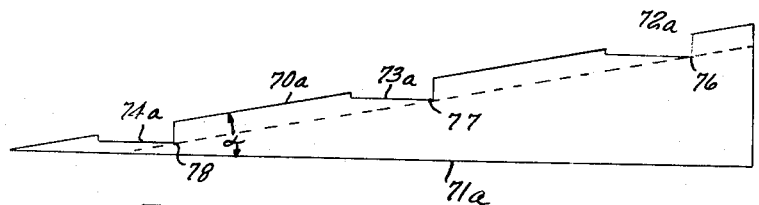

FIGS. 6, 7, 8, 9 and 10 are views in sectional elevation of the nut in locked position on a mating bolt, respectively on lines 6—6, 6–7, 6–8, 6–9 and 6–10 of FIG. 2, to illustrate certain features;

FIG. 11 is a view in sectional elevation of a staking punch assembly for a nut staking machine adapted to produce the locking indentations in a threaded nut blank;

FIG. 12 is a view looking toward the working faces of the staking punch, substantially on line 12—12 of FIG. 11;

FIG. 13 is a diagrammatic view to illustrate the deformation of the thread to form locking indentations in accordance with the invention; and FIG. 14 is a diagrammatic view to illustrate deformations of the thread to form locking indentations in accordance with certain prior art.

Referring now to the drawings, in which like reference characters indicate similar parts throughout the several views, a preferred form of nut 10 embodying the invention is a hex nut having six flats 11 of uniform size and shape, terminating at its upper end in a truncated cone portion 12, commonly referred to in the parlance of trade as a cone, the nut having an annular flat surface 13 lying in a plane parallel with the bottom face 14, except for the depressed areas 15, later to be described; and a threaded bore 16. Nuts of this type are often referred to simply as cone nuts. And although a cone nut is a preferred form of the invention and is shown for illustrative purposes, it will be understood that the locking elements or features of the invention may be embodied in other standard forms of nuts having threaded or tapped bores.

It will be understood that initially the nut 10 was a nut formed in conventional manner and tapped to form standard threads; the tapped nut in conventional form being herein referred to as a "nut-blank" for convenience in distinguishing it from the finished nut embodying the invention, wherein the standard or conventional threads are distorted or deflected to provide clusters 17 of superimposed indentations 18 of substantial arcuate length in the turns of the thread 20 under the depressed areas 15. For convenience of description, the thread is indicated generally by reference numeral 20 and the individual turns of the thread 20 by reference numerals 20a, b, c, etc. (see FIG. 4). The thread 20 comprises root 22, crest 23, and the upper and lower flanks 24 and 25, respectively; these flanks being, respectively, the upper surface 24a and the lower surface 25a of the thread between the crest and root. It may be observed here that the indentations 18 are of substantial arcuate length at the portions under the depressed areas 15 and the crests of these portions lie at the same angle as the helix angle of the thread 20 but the indentations are offset in the depressed areas from the initial position of the thread of the nut blank.

The clusters 17 of equally and circumferentially spaced indentations 18 of substantial arcuate length may be formed by a staking tool suitably mounted to be operated in a staking machine which may be of a construction known to those skilled in the art wherein a power driven ram mounted for reciprocation mounts a staking tool which strikes a blow on the upper surface of the nut which is rested, in known fashion, on a base or pad, indicated generally by reference numeral 26.

As shown, the tool 30 for staking the nut (see FIG. 11) comprises a punch holder 31 secured by a set screw 32' to the reciprocatable power driven ram 32 of a staking machine. The outer end of holder 31 is generally cup shaped having a cylindrical externally threaded wall 33 defining a cylindrical chamber 34 in which is mounted the inner end portion of a staking punch 35. The staking punch has a head 36 which engages the wall 37 of the punch holder. A helical compression spring 38, around the punch rod portion 39 of the punch, engages a washer 40 at one end and the shoulder 41 of a stripper sleeve 42 at its other end; the washer 40 abutting an annular shoulder 43' on the head 36. The punch rod 39 is slidable in sleeve 42. The sleeve and punch assembly are held in place by cup shaped retaining nut 43 threaded on cylindrical wall 33; a locknut 44 locking the retaining nut 43 in place. The retaining nut 43 has a depending hollow extension or boss 45 serving as a guide way for the stripper sleeve 42. The sleeve 42 has an annular bevel 46 complementary to the bevel 12 of the nut 10. It will be understood by those skilled in the art, the manner of operation of the punch, which, after it moves in its forward stroke to strike a blow on the surface of the nut and forms the depressed areas 15, the stripper sleeve is caused to strip the nut from the punch.

The outer end of punch rod 39 has, as shown, three equally spaced radially extending protruding staking portions or bosses 50, each of the same size and dimensions. The height $h$ of the staking bosses 50 corresponds to the depth $d$ of the depressed areas 15 in the nut 10 and the width $w$ corresponds to the width $w'$ of the depressed areas as may be desired. It is particularly significant to note that the end faces 51 of the radially disposed staking bosses 50, are not parallel with a plane at right angles to the central longitudinal axis X of the punch 39, but lie at an angle $\alpha$ which is equal to the helix angle of the thread 20. Hence, when the nut is given a blow by the punch in the nut staking machine, the thread portions under the depressed areas 15 will be offset and at an angle equal to the helix angle of the thread 20. A blind bore 48 in the end of the punch rod provides a central opening at which the inner ends 49 of the staking bosses terminate. The side walls 52, 53 of the staking bosses are tapered just enough to prevent binding when the stripper sleeve 42 strips the nut from the punch. Also, it is significant to note that the sides 52 and 53 of the staking bosses are substantially parallel with their central axes, that is, the side walls 52a and 53a of the depressed areas 15 produced by the punch, are not radial. That is, they do not form a sector shaped area of a circle. Furthermore, the force exerted by the punch is only in an axial direction. The width $w'$ and depth $d$ of the depressed areas 15 for different nuts will be determined by the locking characteristics desired in the finished locknut. As the width is made greater, the arcuate length of the depressed portions 18 are made correspondingly longer, producing stronger spring action of the indentations 18, and hence greater locking power and vice versa. The greater the depth, the greater the amount of offset and the power of the blow of the punch will determine the number of turns of the threads (21a, 21b, 21c) that are offset. Preferably, the staking tool is designed to offset the upper two or three thread turns and the blow of the tool is such that although the amount of offset is substantial, it is adjusted so that the tool will offset the indented thread portions less than half of the pitch of the thread. Preferably, the width $w$ of each of the staking bosses is about 50% of the diameter of the bore of the nut, but this width may range frm 20% to 80% of the diameter of the bore depending on the amount of locking desired. The height $h$ of the staking bosses is slightly greater than the deired depth $d$ of the depressed areas and the blow is adjusted to depress at least two or three turns of the thread of the nut.

Referring to the finished nut, it will be seen that it comprises a plurality of equally, circumferentially spaced depressed areas 15 around the hole, in the cone portion of the nut, the sidewalls 52a and 53a of which are substantially parallel with the radial center line y—y through the bottom of the depression 15 (see FIG. 3). Beneath each depressed area 15 is a cluster of indented or offset thread portions of substantial arcuate length, each cluster comprising thread indentations 18 in vertical alignment in two or more turns of threads, these indented portions of the threads being offset in an amount which is preferably less than half the pitch of the thread and the arcuate thread indentations lie at an angle which is the same as the helix angle of the thread.

Figure 5:
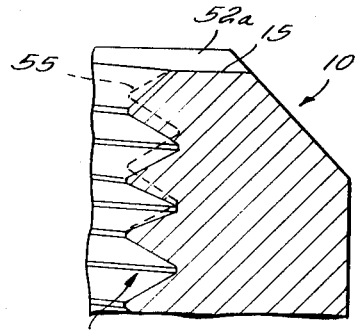
FIG. 5 is a partial view in sectional elevation to illustrate the deformation or deflection of the threads to form a cluster of indentations.

FIG. 5 is intended to illustrate the position of the thread at a depressed area 15 prior to and after staking; dotted lines 55 indicating the position of the thread prior to staking and the full lines indicating the position of the thread under the depressed area 15 after staking; the turns of the thread below the deflected portions remaining in their original position.

Figure 6:
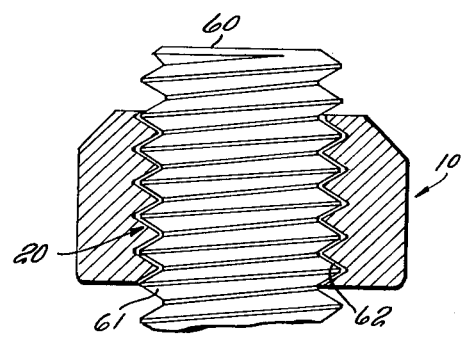
Figure 7:
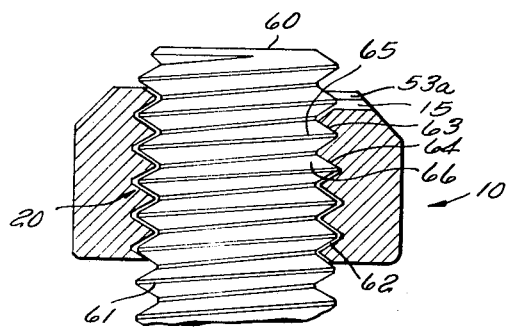
Figure 8:
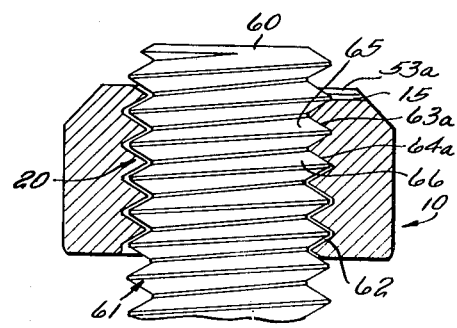
Figure 9:
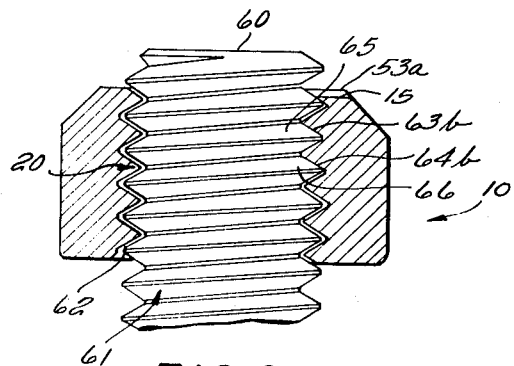
Figure 10:
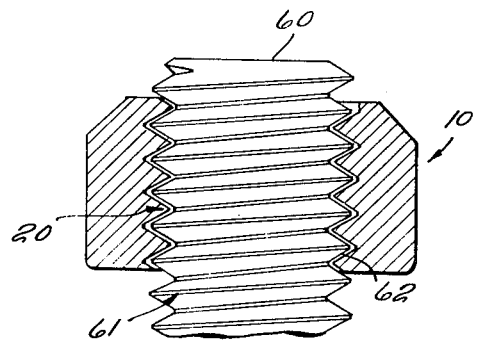

FIGS. 6 to 10, inclusive, are intended to illustrate, in exaggerated fashion for further clarity, the manner in which the arcuate indentations of the thread at each cluster of indentations, engage the upper flank of the corresponding male thread of the bolt, with a spring action all along the arcuate length of the thread indentations. It will be understood that the illustrations in these figures are exaggerated for the purpose of making the underlying concept better understood. In each of FIGS. 6 to 10, inclusive, the nut 10 is shown as having been turned to locked position on the threaded bolt 60, which has a conventional thread 61 to mate with the conventional thread 20 of the nut. The spaces 62 between the flanks of the thread 20 of the nut and the flanks of the thread 61 of the bolt are greatly exaggerated; it being understood that in turning the nut on to the bolt to locked position, there is actually engagement between the flanks of the male and female threads. The significant point to be noted here is that the lower surfaces or flanks 63, 64 of the indentations 18 under the area 15 of the nut, when on the bolt, as viewed on line 6–7 of FIG. 2 and, as shown in FIG. 7 of the drawings, are engaged under spring action with the upper surfaces or flanks 65, 66 of the thread 61 of the bolt. Likewise, as shown in FIG. 8, which is on line 6–8 of FIG. 2, the lower surfaces or flanks 63a, 64a of the indentations 18 are engaged under spring action in the same fashion with the upper surfaces or flanks 65, 66 of the thread 61 of the bolt. Likewise, as shown in FIG. 9, which is on line 6–9 of FIG. 2, the lower surfaces or flanks 63b, 64b of the indentations 18 are engaged under spring action with the upper surfaces or flanks 65, 66 of the thread 61 of the bolt. FIGS. 6 and 10, which are views taken on lines 6—6 and 6–10, respectively, of FIG. 2, where there are no indented or distorted thread portions, illustrate that there is no similar spring action in those portions of the thread which are not deflected or distorted. When the nut, as illustrated in the drawings, is turned on to the bolt to locked position, the distorted portions of the thread or indentations 18 of substantial arcuate length exert a spring action on the flanks of the mating male thread uniformly throughout the entire length of the deflected or distorted thread portions, and inasmuch as there are, as shown in the preferred embodiment, three equally spaced depressed areas 15 with clusters 17 of indentations 18, the locking elements of the nut are nicely balanced around the bolt. It will be understood that although three equally spaced circumferentially disposed depressed areas are preferred and shown for illustrative purposes, another number of equally spaced depressions might be used.

FIG. 13 is a diagrammatic view illustrating the helix of the thread of the nut developed, or laid out flat; the line 70 representing the helix of the thread; line 71 representing horizontal top or bottom face of the nut; α, the helix angle; and p the pitch. The offset portions 72, 73, 74 represent the three indentations 18 in a turn of the thread, the circumferential length of a turn corresponds to the line 75. It will be observed that the offset portions 72, 73, 74 represent the indentations 18 and they lie parallel to the undistorted thread and at the same helix angle. Hence, each indentation 18 in a turn of the thread will engage the mating male thread of the bolt along the entire length of the indentations and with uniform spring action along its length. By shortening or lengthening the offset portion 18, by suitable modification of the punch, the friction or spring power may be decreased or increased thus to vary and control the locking effect.

FIG. 14 is a similar kind of diagram to the same scale as FIG. 13, but shows the effect of a staking tool or punch having its contacting surfaces parallel with the upper face of the nut. Line 70a represents the helix; 72a, 73a, 74a represent the indentations made when the bottom faces of the staking punch lie parallel with the line 71a, which represents the horizontal top or bottom face of the nut. Now it will be seen that the indentations 72a, 73a, 74a, will not engage the flank of the mating male thread of the bolt uniformly throughout the lengths of the indentations but will engage the mating flanks of the male thread with its greatest pressure at localized points or areas 76, 77, 78 and, hence, lengthening or shortening the indentations 72a, 73a, 74a will have little, if any, effect upon the friction with the flank of the mating male thread, and consequently little effect upon varying locking power.

As mentioned hereinbefore, nuts may be made, according to the invention, which meet the specifications of the Industrial Fasteners Institute, for prevailing-torque locknuts. Furthermore, there is no difficulty in identifying the top ends of the nuts, which are the locking ends. The identification may be made visually or mechanically. Hence, the nuts are "directional" prevailing-torque locknuts. And in the preferred form they may be used in mechanical feeding and wrenching devices.

By way of example and for contrasting the characteristics of nuts made according to the invention as described herein with the specifications of the Industrial Fasteners Institute, the results of tests of twenty randomly selected nuts embodying the invention are set forth in the following Table I. The specifications for a given 3/8" Grade B nut, require that the prevailing on-torque on first installation shall not exceed a maximum of 80 inch pounds and the breakaway torque shall not be less than 12 inch pounds for the first removal; and the breakaway torque on fifth removal shall not be less than 8.5 inch pounds.

TABLE I

[Tests on twenty randomly selected 3/8" Grade B nuts embodying the invention]

| Sample No. | Initial Prevailing On-Torque | First Removal | | Fifth Removal | |
|---|---|---|---|---|---|
| | | Breakaway Torque | Prevailing Off-Torque | Breakaway Torque | Prevailing Off-Torque |
| 1 | 45 | 45 | 40 | 35 | 35 |
| 2 | 45 | 40 | 35 | 30 | 35 |
| 3 | 35 | 30 | 35 | 20 | 25 |
| 4 | 35 | 30 | 30 | 20 | 20 |
| 5 | 35 | 30 | 30 | 25 | 20 |
| 6 | 65 | 55 | 50 | 40 | 35 |
| 7 | 35 | 35 | 35 | 20 | 20 |
| 8 | 50 | 45 | 40 | 25 | 25 |
| 9 | 70 | 60 | 60 | 45 | 40 |
| 10 | 30 | 30 | 30 | 25 | 25 |
| 11 | 50 | 45 | 40 | 35 | 30 |
| 12 | 50 | 45 | 40 | 35 | 30 |
| 13 | 50 | 50 | 45 | 30 | 30 |
| 14 | 35 | 35 | 35 | 20 | 20 |
| 15 | 35 | 30 | 25 | 20 | 20 |
| 16 | 40 | 40 | 35 | 35 | 30 |
| 17 | 35 | 35 | 35 | 35 | 30 |
| 18 | 35 | 30 | 30 | 25 | 25 |
| 19 | 35 | 30 | 35 | 20 | 25 |
| 20 | 50 | 45 | 50 | 35 | 35 |

It will be seen that the nuts referred to in Table I far exceeded the requirements of the specifications for prevailing-torque locknuts. Moreover, nuts may be produced according to the invention which, even after twenty removals, show breakaway and prevailing off-torques greater than that required by the specifications on the fifth removal.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A prevailing-torque locknut comprising a hexagonal nut body portion having six smooth flats of equal shape, size and dimensions; a substantially flat bottom surface; an upper end portion opposite said nut bottom of truncated cone shape; and a central axially extending threaded bore through said truncated cone and body portions, said truncated cone portion having an annular top surface of substantial radial width surrounding said bore at its uppermost end and the inclined conical surface of said truncated cone extending from said annular surface and terminating at its lower end within the perimeter of the hexagon formed by said six flats at their upper ends so that there is a wall of substantial radial thickness around said bore which is progressively greater in radial thickness from said annular top surface to said body portion; a plurality of circumferentially, equally spaced depressions of like shape and dimensions around said bore in the upper surface of said truncated cone portion, each of said depressions extending outwardly from said bore through the outside inclined surface of said truncated cone portion, the center lines through the bottoms of said depressions lying radially and each of said bottoms lying at the same depth from the top surface of said truncated cone as the others and each bottom of said depressions lying in a plane at an angle with the said bottom of the nut equal to the helix angle of the thread of the bore and lying parallel with the helix of said thread and the sides of each of said depressions lying in substantially parallel planes substantially perpendicular to said bottom surface of the nut and equidistant from the said center line of the bottom of each depression; a cluster of axially depressed offset arcuate thread segments in the upper turns of the thread of said nut below each of the bottoms of said depressions, each of said clusters comprising a plurality of vertically aligned offset arcuate thread segments free from blunted crests, each cluster having an arcuate length at least 20% of and less than 80% of the diameter of said bore, the thread of said nut being conventional and undistorted except for said arcuate offset segments and said arcuate offset segments lying at the same helix angle as the helix angle of said thread and the offset thread segments in the upper turn of said thread being vertically offset from the undistorted parts of said thread a substantial amount but less than half the pitch of said thread.

2. A prevailing-torque locknut according to claim 1, in which the said circumferentially, equally spaced depressions are three in number.

3. A prevailing-torque locknut according to claim 2, in which the arcuate length of said offset thread segments is about 50% of the diameter of the bore.

4. A prevailing-torque locknut according to claim 3, in which said arcuate offset segments frictionally engage the mating flank of the male thread of a threaded stud of corresponding size with uniform spring action throughout their arcuate lengths when said nut is wrenched on to said bolt into locked position.

References Cited
UNITED STATES PATENTS

| | | |
|---|---|---|
| 1,298,583 | 3/1919 | Sharp. |
| 2,352,668 | 7/1944 | Tripp. |
| 2,586,786 | 2/1952 | Cole. |

CARL W. TOMLIN, *Primary Examiner.*

R. S. BRITTS, *Assistant Examiner.*